United States Patent [19]

Doshi

[11] Patent Number: 4,762,669

[45] Date of Patent: Aug. 9, 1988

[54] NUCLEAR REACTOR CORE CONTAINING FUEL ASSEMBLIES POSITIONED ADJACENT CORE BAFFLE STRUCTURE HAVING ANNULAR ANTI-VIBRATION GRIDS

[75] Inventor: Pratap K. Doshi, Murrysville Boro, Pa.

[73] Assignee: Westinghouse Electric Corp., Pittsburgh, Pa.

[21] Appl. No.: 50,833

[22] Filed: May 13, 1987

[51] Int. Cl.[4] .............................................. G21C 3/34
[52] U.S. Cl. ..................................... 376/442; 376/439; 376/443; 376/449.
[58] Field of Search ................ 376/439, 442, 443, 449

[56] References Cited

U.S. PATENT DOCUMENTS

| | | | |
|---|---|---|---|
| 3,481,832 | 12/1969 | Rickert | 176/50 |
| 3,940,311 | 2/1976 | Frisch et al. | 176/36 R |
| 4,096,032 | 6/1978 | Mayers et al. | 176/38 |
| 4,096,033 | 6/1978 | Barry | 176/78 |
| 4,155,807 | 5/1979 | Schreiber | 176/78 |
| 4,325,786 | 4/1982 | Wohlsen | 376/442 |
| 4,326,919 | 4/1982 | Hill | 376/267 |
| 4,521,374 | 6/1985 | Duncan | 376/462 |
| 4,576,786 | 3/1986 | DeMario | 376/439 |
| 4,692,302 | 9/1987 | DeMario | 376/439 |

Primary Examiner—Donald P. Walsh

[57] ABSTRACT

In a nuclear reactor, the core is composed of fuel assemblies disposed in side-by-side spaced relationships with an outer group thereof defining the periphery of the core and an inner group thereof positioned inwardly of the outer group. A baffle structure extends about the reactor core adjacent the fuel assemblies in the outer group. Any jetting of coolant fluid through the baffle structure will impinge upon fuel rods in the outer group of fuel assemblies so as to cause vibration of the fuel rods. To prevent such vibration, a plurality of annular anti-vibration grids are axially spaced along and connected to guide thimbles of the fuel assemblies in the outer group thereof between at least some of the support grids of such fuel assemblies. The annular grids are separate from and unconnected to the support grids. Each annular grid defines a plurality of cells being less in number than the multiplicity of fuel rods of each fuel assembly in the outer group but at least equal in number to the plurality of the fuel rods positioned about the periphery of each such fuel assembly. The cells receive respective ones of the peripheral fuel rods therethrough and engage them so as to dampen vibration thereof due to impingement by coolant fluid jetting from the baffle structure.

16 Claims, 8 Drawing Sheets ial anti-vibration grids which are designed to sat-

NUCLEAR REACTOR CORE CONTAINING FUEL ASSEMBLIES POSITIONED ADJACENT CORE BAFFLE STRUCTURE HAVING ANNULAR ANTI-VIBRATION GRIDS

CROSS REFERENCE TO RELATED APPLICATIONS

Reference is hereby made to the following U.S. patent applications dealing with related subject matter and assigned to the assignee of the present invention:

1. "A Partial Grid For A Nuclear Reactor Fuel Assembly" by Edmund E. DeMario et al, assigned U.S. Ser. No. 564,049 and filed Dec. 21, 1983, now U.S. Pat. No. 4,576,786.

2. "A Low Pressure Drop Grid For A Nuclear Reactor Fuel Assembly" by Edmund E. DeMario et al, assigned U.S. Ser. No. 567,448 and filed Dec. 30, 1983, now abandoned.

3. "A Coolant Flow Mixer Grid For A Nuclear Reactor Fuel Assembly" by Edmund E. DeMario et al, assigned U.S. Ser. No. 567,450, filed Dec. 30, 1983, now U.S. Pat. No. 4,692,302.

BACKGROUND OF THE INVENTION

1. Field of the Invention

The present invention relates generally to fuel assemblies for a nuclear reactor and, more particularly, is concerned with fuel assemblies positioned adjacent the baffle structure about the periphery of the reactor core which employ annular anti-vibration grids.

2. Description of the Prior Art

A typical nuclear power reactor includes a reactor vessel housing a nuclear reactor core. Spaced radially inwardly from the reactor vessel is a generally cylindrical core barrel and within the barrel is a former and baffle system (hereinafter called a baffle structure) which permits transition from the cylindrical barrel to a squared off periphery of the reactor core formed by the fuel assemblies arrayed therein.

The reactor core is composed of a large number of elongated fuel assemblies. Each fuel assembly includes a plurality of fuel rods containing the fissile material which reacts to produce heat. The fuel rods of each fuel assembly are held in an organized array by a plurality of grids spaced axially along the fuel assembly length and attached to a plurality of elongated control rod guide thimbles of the fuel assembly.

During operation of the reactor, a coolant fluid such as water, is typically pumped into the reactor vessel through a plurality of inlet nozzles. The coolant fluid passes downward through an annular region defined between the reactor vessel and core barrel, turns in a lower plenum defined in the reactor vessel, then passes upwardly through the fuel assemblies of the reactor core, and exits from the vessel through a plurality of outlet nozzles extending through the core barrel. Heat energy which the fuel rods of the fuel assemblies impart to the coolant fluid is carried off by the fluid from the vessel. Due to the existence of holes in the core barrel, coolant fluid is also present between the barrel and baffle structure and at a higher pressure than within the core. However, the baffle structure together with the core barrel do separate the coolant fluid from the fuel assemblies as the fluid flows downwardly through the annular region between the reactor vessel and core barrel.

As mentioned above, the baffle structure surrounds the fuel assemblies of the reactor core. Typically, the baffle structure is made of plates joined together by bolts. These bolts sometimes become loose thereby developing a small gap between the baffle structure plates. When this happens, a coolant fluid jetting action takes place through the baffle structure in a radially inward direction from the exterior to the interior thereof due to the greater fluid pressure existing outside of the baffle than within the core. The fluid jetting, when it impinges on the outer row of fuel assemblies in the core, makes their outer fuel rods vibrate, eventually causing them to fail.

Consequently, the need exists for a way to deal effectively with fluid jetting through loosened portions of the baffle structure so as to avoid its deleterious effects on the fuel rods of the fuel assemblies positioned adjacent the baffle structure.

SUMMARY OF THE INVENTION

The present invention provides fuel assemblies with annular anti-vibration grids which are designed to satisfy the aforementioned needs. In particular, the fuel assemblies positioned adjacent the baffle structure about the periphery of the reactor core employ annular anti-vibration grids inserted between the regular grids and anchored to the guide thimbles like the regular grids. The annular grids will only occupy the space about the outer three rows of fuel rods in the fuel assemblies positioned at the core periphery. The grids will retard or dampen vibration of the fuel rods in these outer rows. Specifically, the presence of the annular grid reduces the length of the span of the fuel rods being unsupported between the regular grids, while also changing their vibrational frequency, thereby preventing the fuel rod damage experienced heretofore from vibrations caused by the coolant fluid jetting action through the baffle structure. In such manner, the deleterious effects of fluid jetting through the baffle structure will be substantially avoided.

The fuel assemblies having the annular grids are only placed in core locations most susceptible to coolant fluid jetting action through the baffle structure. Since the number of such fuel assemblies will be small, the impact of the presence of the annular grids on overall core pressure drop will be small. Also, since these outside peripheral locations typically have small relative power, the fuel assemblies using these grids will not become DNB limiting.

In instances where intermediate flow mixer grids, such as disclosed in the third application cross-referenced above, are already present between the regular grids in the top half of the fuel assemblies, the annular anti-vibration grids will only be used in the bottom half of the fuel assemblies.

Accordingly, the present invention is directed to an improvement in a nuclear reactor fuel assembly. The fuel assembly includes a top nozzle, a bottom nozzle, and a plurality of guide thimbles extending longitudinally between and connected at their opposite ends to the top and bottom nozzles. The fuel assembly also has a multiplicity of elongated fuel rods and a plurality of support grids axially spaced along and supported by the guide thimbles. Each of the support grids defines a multiplicity of cells at least equal in number to the multiplicity of fuel rods for receiving respective ones of the fuel rods therethrough and supporting the fuel rods in a side-by-side array with respect to one another and to the guide thimbles. The improvement comprises a plurality of annular anti-vibration grids axially spaced along and connected to the guide thimbles between at least some of the support grids. The annular grids are separate from and unconnected to the support grids. Each of the annular grids defines a plurality of cells being less in number than the multiplicity of fuel rods but at least equal in number to a plurality of the fuel rods positioned along the periphery of the multiplicity of fuel rods. The annular grid cells receive therethrough respective ones of the fuel rods in the plurality thereof and engage these fuel rods so as to dampen any coolant fluid cross flow vibration induced therein.

Furthermore, each of the annular grids is composed of a plurality of interleaved members arranged in an egg-crate configuration to define the plurality of cells and a central void region of a size to receive therethrough the rest of the fuel rods in the multiplicity thereof. Each of the annular grids includes a plurality of protrusions formed on the members and projecting into each of the cells in the plurality thereof through a sufficient distance to contact opposing sides of the fuel rod received through each cell. Also, a number of sleeves adapted to receive a like number of the guide thimbles therethrough are connected to the members. The number of the guide thimbles is less than the plurality thereof. The sleeves are unconnected with, and shorter in length than the distance between, the ones of the support grids disposed adjacent to each annular grid.

Also, the present invention is directed to the combination in a nuclear reactor, comprising: (a) a reactor core composed of a plurality of fuel assemblies disposed in side-by-side spaced relationships, a first group of the fuel assemblies defining the periphery of the core and a second group of the fuel assemblies positioned inwardly of the first group thereof; (b) each of the fuel assemblies having a plurality of elongated guide thimbles, a multiplicity of elongated fuel rods, a plurality of support grids axially spaced along and supported by the guide thimbles, each of the support grids defining a multiplicity of cells at least equal in number to the multiplicity of fuel rods for receiving respective ones of the fuel rods therethrough and supporting the fuel rods in a side-by-side array with respect to one another and to the guide thimbles; (c) a baffle structure extending about the reactor core adjacent to the fuel assemblies in the first group thereof, the baffle structure having components being subject to unpredictable loosening with respect to one another so as to permit jetting of coolant fluid from the exterior to the interior of the baffle structure and impingement upon fuel rods in the fuel assemblies of the first group thereof so as to cause vibration of the fuel rods; and (d) a plurality of annular anti-vibration grids axially spaced along and connected to the guide thimbles of the fuel assemblies in the first group thereof between at least some of the support grids of the fuel assemblies in the first group thereof, the annular grids being separate from and unconnected to the support grids. Each of the annular grids defines a plurality of cells being less in number than the multiplicity of fuel rods of each of the fuel assemblies in the first group thereof but at least equal in number to the plurality of the fuel rods positioned along the periphery of the each fuel assembly in the first group thereof for receiving respective ones of said fuel rods therethrough and engaging the fuel rods so as to dampen vibration thereof due to impingement by coolant fluid jetting from the baffle structure.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
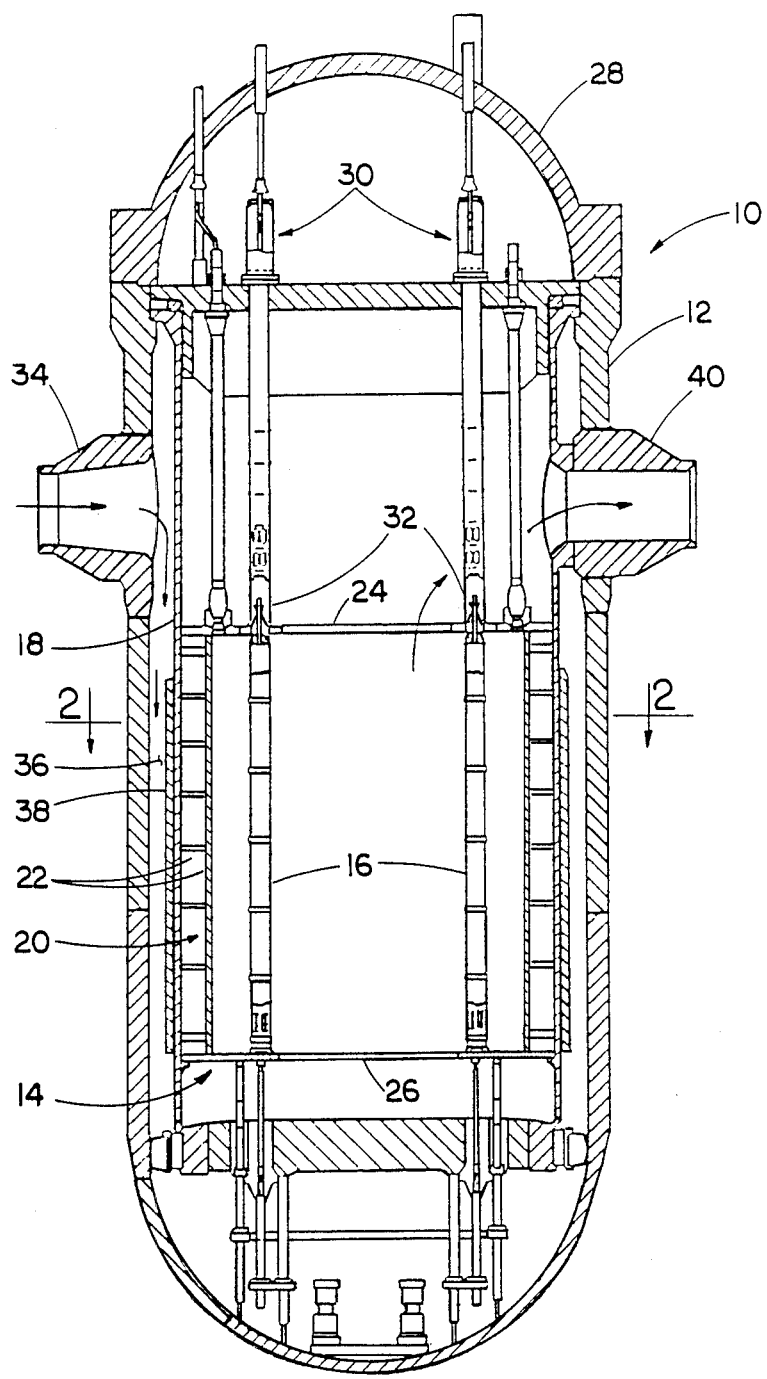
FIG. 1 is a view, partly in section and partly in elevation, of a nuclear reactor to which the present invention may be applied.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
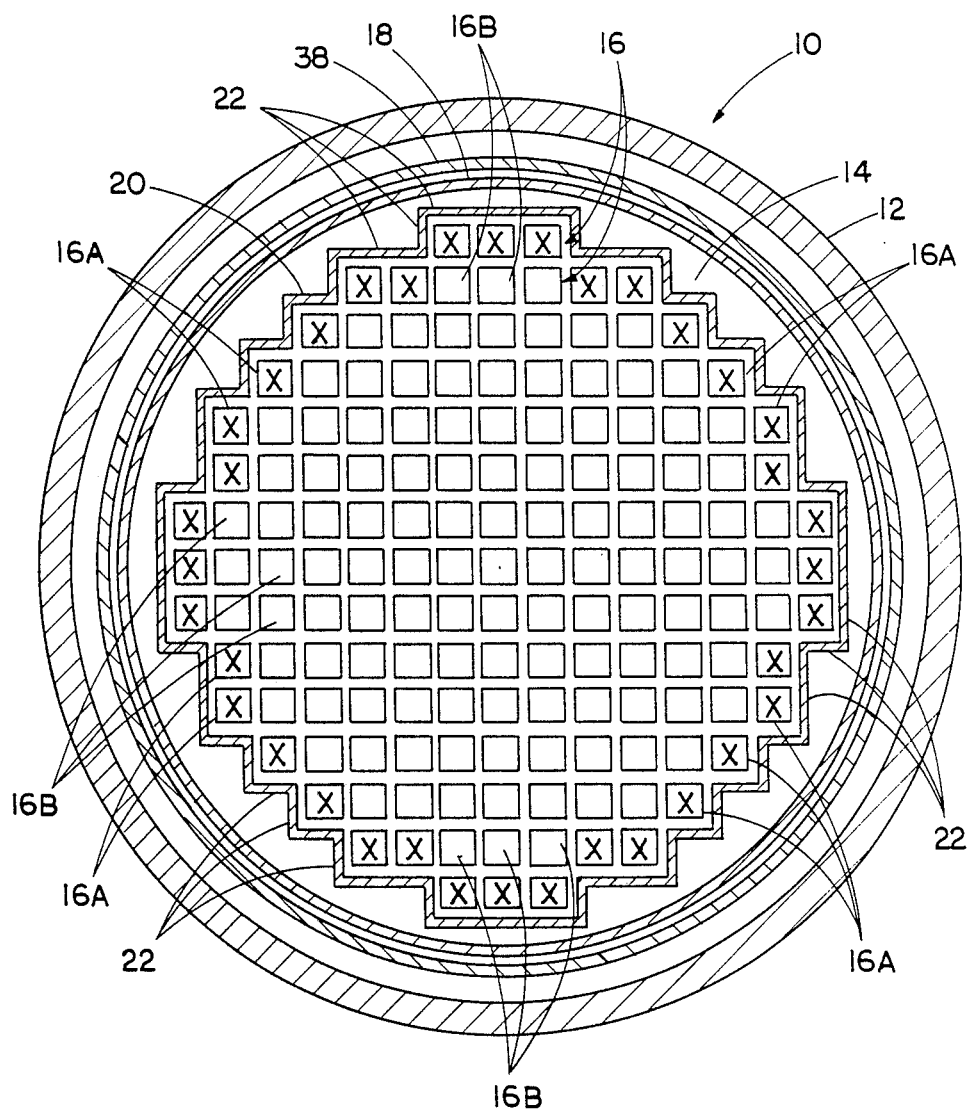
FIG. 2 is a simplified enlarged plan view of the reactor taken along line 2—2 of FIG. 1.

Referring now to the drawings, and particularly to FIGS. 1 and 2, there is shown a pressurized water nuclear reactor (PWR), being generally designated by the numeral 10. The PWR 10 includes a reactor pressure vessel 12 which houses a nuclear reactor core 14 composed of a plurality of elongated fuel assemblies 16. The relatively few fuel assemblies 16 shown in FIG. 1 is for purposes of simplicity only. In reality, as schematically illustrated in FIG. 2, the core 14 is composed of a great number of fuel assemblies 16.

Spaced radially inwardly from the reactor vessel 12 is a generally cylindrical core barrel 18 and within the barrel 18 is a former and baffle system, hereinafter called a baffle structure 20, which permits transition from the cylindrical barrel 18 to a squared off periphery of the reactor core 14 formed by the plurality of fuel assemblies 16 being arrayed therein. The baffle structure 20 surrounds the fuel assemblies 16 of the reactor core 14. Typically, the baffle structure 20 is made of plates 22 joined together by bolts (not shown). The reactor core 14 and the baffle structure 20 are disposed between upper and lower core plates 24,26 which, in turn, are supported by the core barrel 18.

The upper end of the reactor pressure vessel 12 is hermetically sealed by a removable closure head 28 upon which are mounted a plurality of control rod drive mechanisms 30. Again, for simplicity, only a few of the many control rod drive mechanism 30 are shown. Each drive mechanism 30 selectively positions a rod cluster control mechanism 32 above and within some of the fuel assemblies 16.

A nuclear fission process carried out in the fuel assemblies 16 of the reactor core 14 produces heat which is removed during operation of the PWR 10 by circulating a coolant fluid, such as light water, through the core 14. More specifically, the coolant fluid is typically pumped into the reactor pressure vessel 12 through a plurality of inlet nozzles 34 (only one of which is shown in FIG. 1). The coolant fluid passes downward through an annular region 36 defined between the reactor vessel 12 and core barrel 18 (and a thermal shield 38 on the core barrel) until it reaches the bottom of the reactor vessel 12 where it turns 180 degrees prior to flowing up through the lower core plate 26 and then the reactor core 14. On flowing upward through the fuel assemblies 16 of the reactor core 14, the coolant fluid is heated to reactor operating temperatures by the transfer of heat energy from the fuel assemblies 16. The hot coolant fluid then exits the reactor vessel 12 through a plurality of outlet nozzles 40 (only one being shown in FIG. 1) extending through the core barrel 18. Thus, heat energy which the fuel assemblies 16 impart to the coolant fluid is carried off by the fluid from the pressure vessel 12.

Due to the existence of holes (not shown) in the core barrel 18, coolant fluid is also present between the barrel 18 and baffle structure 20 and at a higher pressure than within the core 14. However, the baffle structure 20 together with the core barrel 18 do separate the coolant fluid from the fuel assemblies 16 as the fluid flows downwardly through the annular region 36 between the reactor vessel 12 and core barrel 18.

Figure 3:
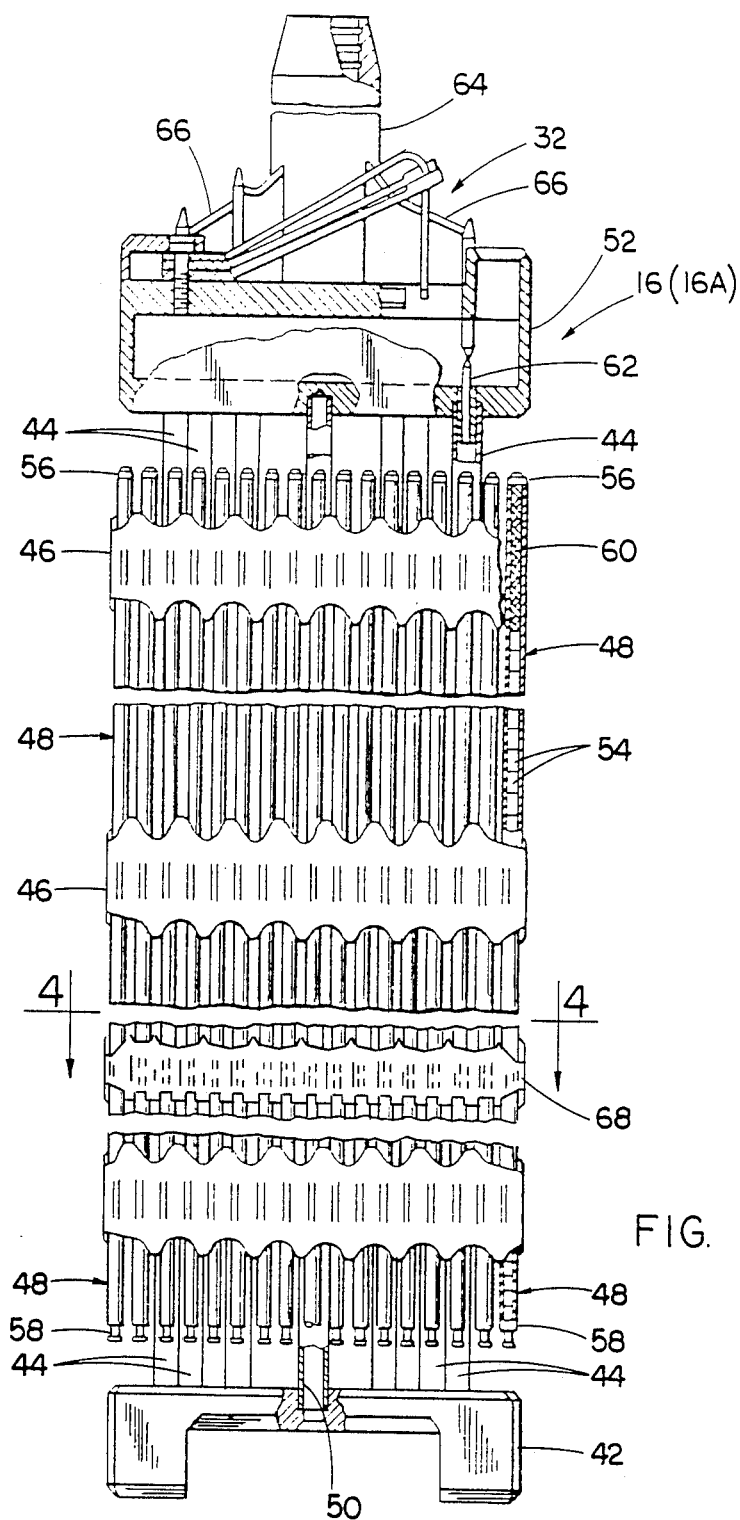
FIG. 3 is an elevational view, partly in section, of one of the fuel assemblies employing an annular anti-vibration grid and being installed at peripheral core locations shown in FIG. 2.

As briefly mentioned above, the reactor core 14 is composed of a large number of elongated fuel assemblies 16. Turning to FIG. 3, each fuel assembly 16, being of the type used in the PWR 10, basically includes a lower end structure or bottom nozzle 42 which supports the assembly on the lower core plate 26 and a number of longitudinally extending guide tubes or thimbles 44 which project upwardly from the bottom nozzle 42. The assembly 16 further includes a plurality of regular transverse support grids 46 axially spaced along the lengths of the guide thimbles 44 and attached thereto. The grids 46 transversely space and support a plurality of elongated fuel rods 48 in an organized array thereof. Also, the assembly 16 has an instrumentation tube 50 located in the center thereof and an upper end structure or top nozzle 52 attached to the upper ends of the guide thimbles 44. With such arrangement of parts, the fuel assembly 16 forms an integral unit capable of being conveniently handled without damaging the assembly parts.

Each fuel rod 48 of the fuel assembly 18 includes nuclear fuel pellets 54 and the opposite ends of the rod are closed by upper and lower end plugs 56,58 to hermetically seal the rod. Commonly, a plenum spring 60 is disposed between the upper end plug 56 and the pellets 54 to maintain the pellets in a tight, stacked relationship within the rod 48. The fuel pellets 54 composed of fissile material are responsible for creating the reactive power which generates heat in the core 14 of the PWR 10. As mentioned, the coolant fluid is pumped upwardly through each of the fuel assemblies 10 of the core 14 in order to extract heat generated therein for the production of useful work.

To control the fission process, a number of control rods 62 of each rod cluster control mechanism 32 are reciprocally movable in the guide thimbles 44 located at predetermined positions in the fuel assembly 16. (Not all of the fuel assemblies 16 have rod cluster control mechanism 32 and thus control rods 62 associated therewith. In fact, only a small minority of the fuel assemblies do.) Specifically, each rod cluster control mechanism 32 is associated with the top nozzle 52 of the respective fuel assembly 16. The control mechanism 32 has an internally threaded cylindrical member 64 with a plurality of radially extending flukes or arms 66. Each arm 66 is interconnected to one or more control rods 62 such that the control mechanism 32 is operable to move the control rods 62 vertically in the guide thimbles 44 to thereby control the fission process in the fuel assembly 16, all in a well-known manner.

All of the fuel assemblies 16 in the reactor core 14 have the conventional construction just described. However, an outer group of the fuel assemblies, each being designated as 16A and also identified by an "x" in the square boxes in FIG. 2, which are located along the periphery of the core 14 adjacent the baffle structure 20 also employ annular anti-vibration grids 68, a preferred embodiment of which is seen in FIGS. 3-6. The remainder of the fuel assemblies 16B in an inner group, which constitutes the vast majority of fuel assemblies in the core 14 and are positioned inwardly of and encompassed by the outer group of fuel assemblies, have no need for and thus do not employ the annular grids 68.

As mentioned earlier, the baffle structure 20 which surrounds the fuel assemblies 16 of the reactor core 14 is made of plates 22 joined together by bolts (not shown). These bolts sometimes become loose thereby developing a small gap between the baffle structure plates 22. When this happens, a jetting action of the coolant fluid takes place through the baffle structure 20 in a radially inward direction from the exterior to the interior thereof due to the greater fluid pressure existing outside of the baffle structure 20 than within the core 14. In absence of the one or more of the annular anti-vibration grids 68 in the peripheral or outer group of fuel assemblies 16A in the core 14, the fluid jets impinging thereon would make their outer fuel rods 48 vibrate, eventually causing them to fail.

Figure 4:
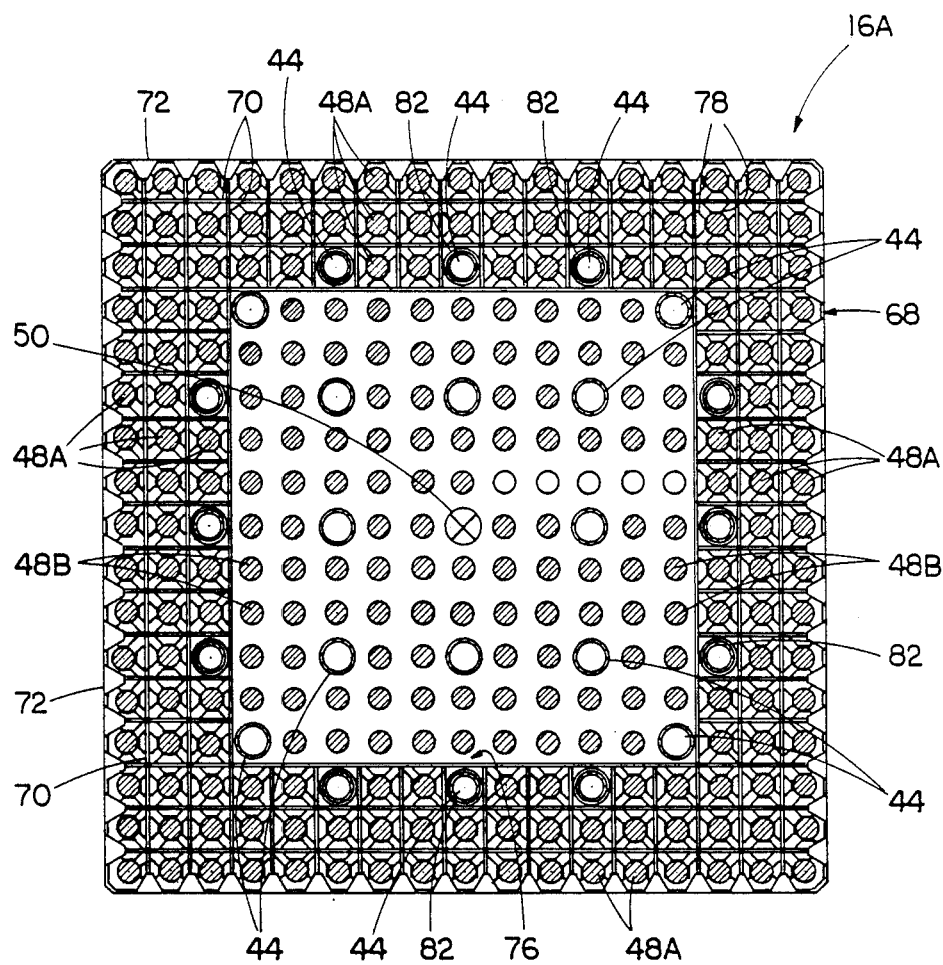
FIG. 4 is an enlarged cross-sectional view of the fuel assembly taken along line 4—4 of FIG. 3, showing a top plan view of the annular anti-vibration grid.
Figure 5:
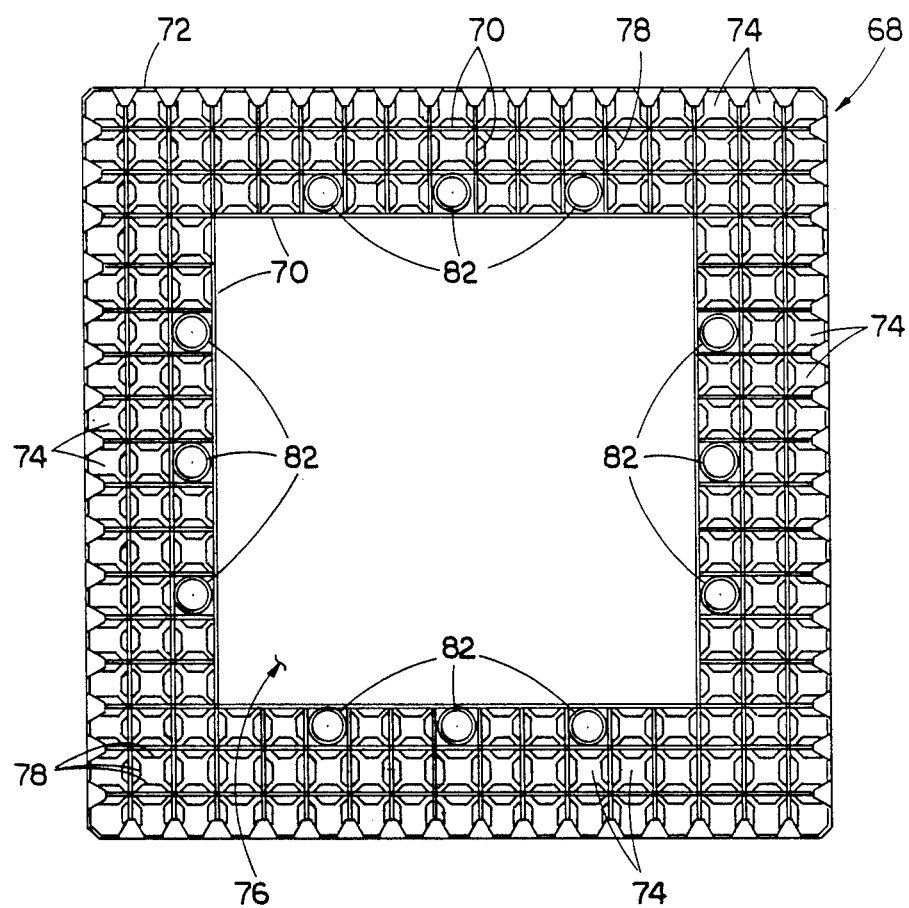
FIG. 5 is a view of top plan view of the annular grid of FIG. 4 removed from the fuel assembly.
Figure 6:
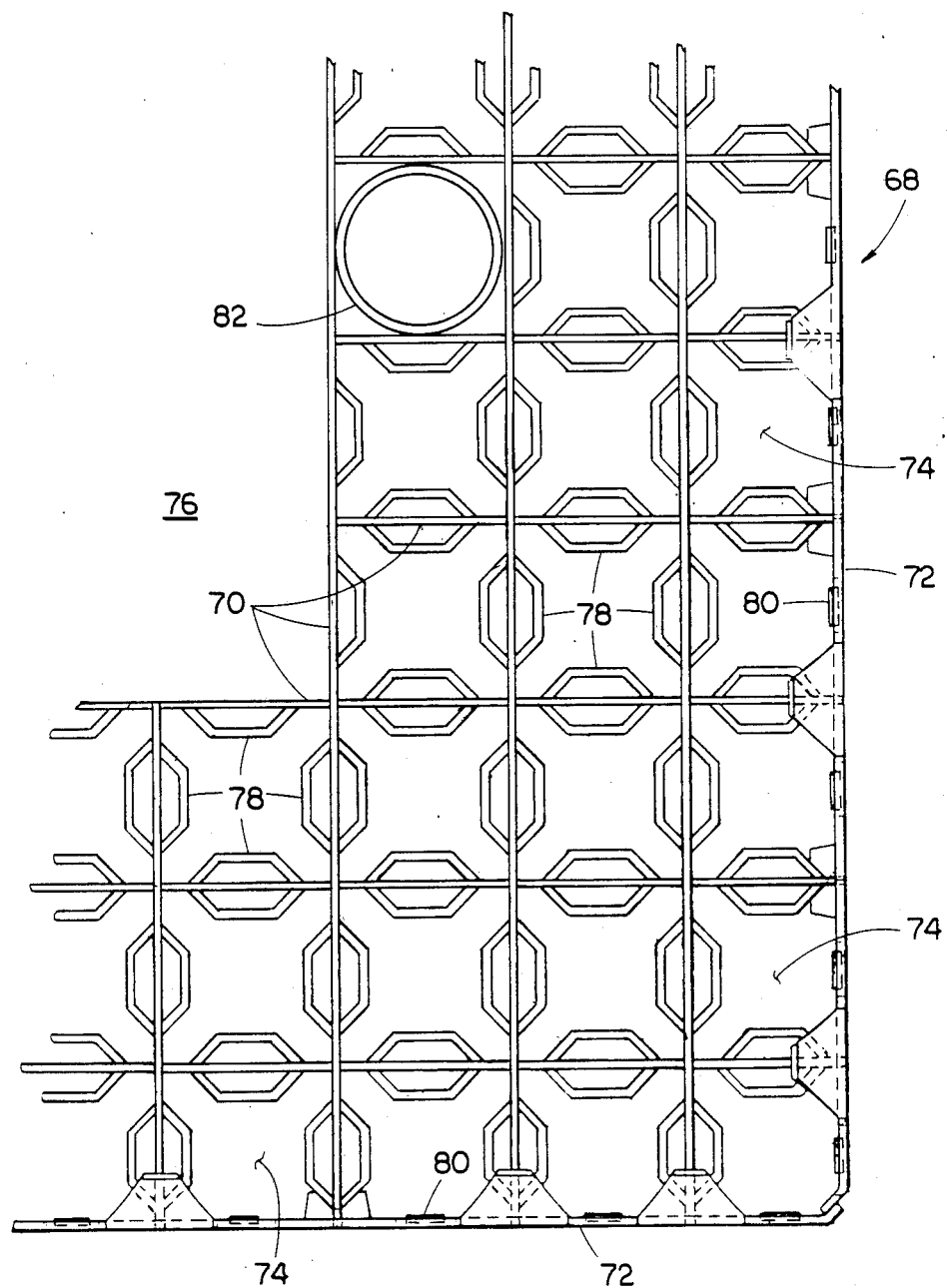
FIG. 6 is an enlarged top plan view of the lower right portion of the annular grid of FIG. 5.
Figure 7:
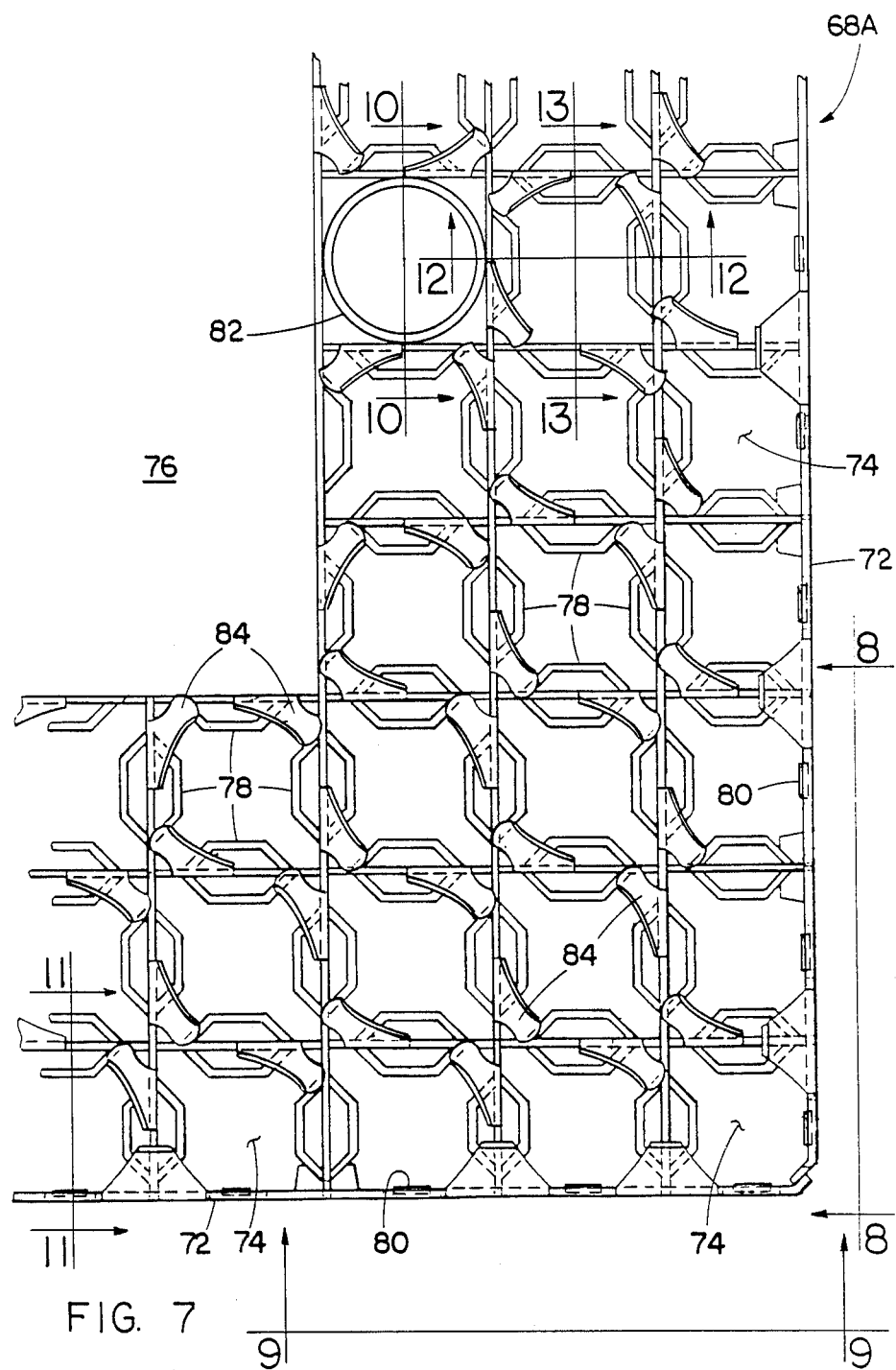
FIG. 7 is an enlarged top plan view of the lower right portion of an alternative annular grid being substantially identical to the annular grid of FIG. 5 except for the addition of the flow mixing vanes on the alternative grid.
Figure 8:
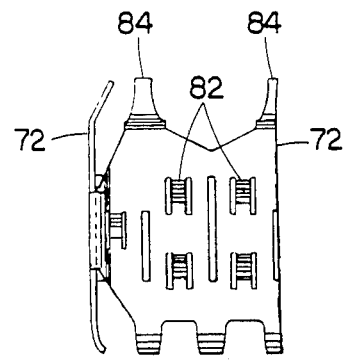
FIGS. 8 and 9 are elevational views of portions of the outer straps at the lower right corner of the annular grid as seen along respective lines 8—8 and 9—9 of FIG. 7.
Figure 9:
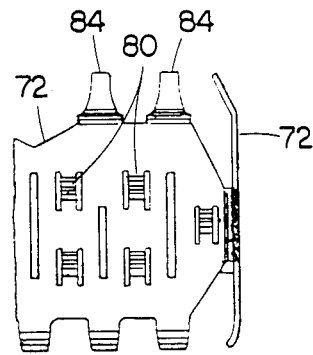
Figure 10:
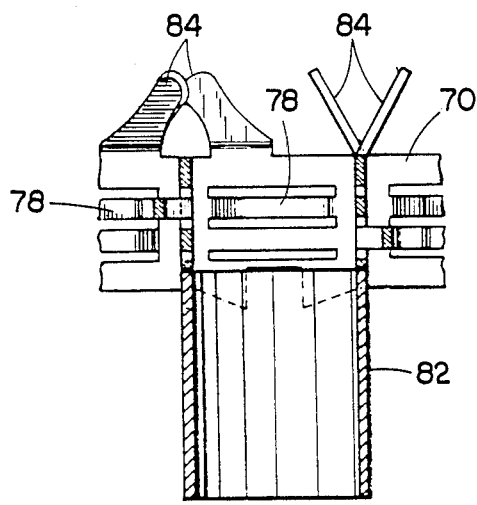
FIG. 10 is a sectional view taken along line 10—10 of FIG. 7, showing a guide thimble receiving cell opening through the annular grid and a sleeve thereon for mounting the grid on a guide thimble of the fuel assembly.
Figure 11:
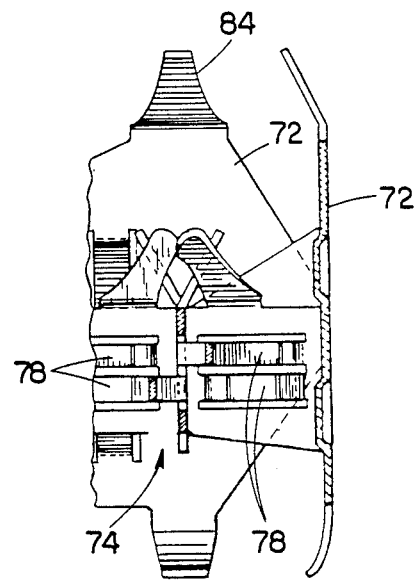
FIG. 11 is a sectional view taken along line 11—11 of FIG. 7, showing the interconnection of the end portion of one of the inner straps to an outer strap of the annular grid.
Figure 12:
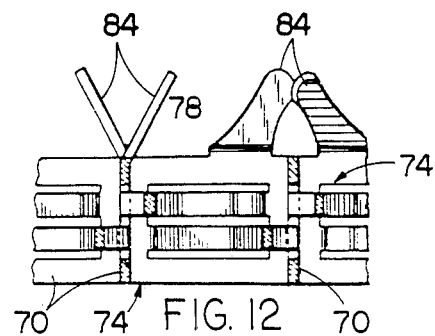
FIGS. 12 and 13 are sectional views taken along respective lines 12—12 and 13—13 of FIG. 7, showing the relationship of the dimples associated with the inner straps of one of the fuel rod receiving cell openings through the annular grid.
Figure 13:
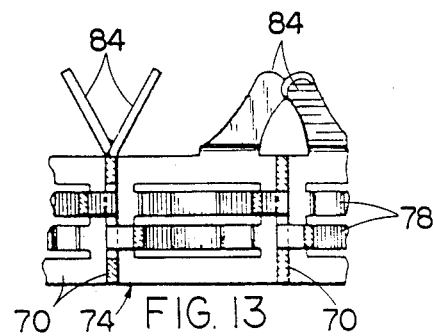

Referring to FIGS. 4-6, the preferred embodiment of the annular anti-vibration grid 68 basically includes a plurality of interleaved inner and outer straps 70, 72 arranged and connected together, such as by welding, in an egg-crate configuration to define a plurality of hollow cells 74 open at their opposite ends and a large central generally square-shaped void region 76. Whereas each of the regular support grids 46, as conventionally known, defines a multiplicity of cells at least equal in number to the multiplicity or total number of the fuel rods 48 for receiving therethrough respective ones thereof and supporting them in a side-by-side array with respect to one another and to the guide thimbles 44, the plurality of cells 74 of the annular grid 68 is less in number than the multiplicity or total number of the fuel rods 48 in each fuel assembly 16A but are at least equal in number to a plurality of fuel rods positioned about the periphery of the multiplicity of fuel rods 48. Preferably, the cells 74 are equal in number to the number of fuel rods 48A in the outer three continuous rows in the square array of fuel rods. The cells 74 of the annular grid are sized to receive therethrough respective ones of the fuel rods 48A in the plurality thereof and engage the fuel rods so as to dampen any coolant fluid jetting or cross flow vibrations induced therein. On the other hand, the large central generally square-shaped void region 76 of the annular grid 68 is of a size adapted to receive therethrough the rest of the fuel rods 48 in the multiplicity thereof or those fuel rods 48B (which add up to a minority of the fuel rods) in the square array thereof bounded by the outer three continuous rows of fuel rods 48A.

The preferred embodiment of the annular grid 68 seen in FIGS. 4-6 also includes means in the form of dimples or protrusions 78,80 defined on the respective inner and outer straps 70,72 which project from the planes of the respective straps into the cells 74 for engaging respective ones of the fuel rods 48A extending through the cells. Instead of protrusions 78 on the inner straps 70 forming a number of the cells 74, such number of the cells of the preferred annular grid 68 receive a like number of hollow cylindrical sleeves 82 therein. The sleeves 82 are attached, such as by welding, to the respective inner straps 70 and sized to receive a like number of the guide thimbles 44 therethrough for attachment of the annular grid 68 to those of the guide thimbles. The sleeves 82 can be attached to the like number of the guide thimbles 46 (for example, twelve thimbles in a 17×17 fuel assembly design) in a conventional way, such as by bulging or welding, such being the same manner that similiar sleeves (not shown) on the regular support grids 46 are attached to the guide thimbles 46.

The alternative embodiment of the annular grid 68A seen in FIGS. 7-13 has the same protrustions 78, 80 and sleeves 82 as the preferred annular grid 68 and so reference should also be made to FIGS. 8-13 in the following discussion of the protrusions 78,80 and sleeves 82. The only difference between the preferred and alternative embodiments of the annular grids 68,68A is the inclusion of coolant flow deflecting means in the form of angular mixing vanes 84 formed on the inner and outer straps 78,80 which project upwardly and inwardly therfrom toward a central longitudinal axis of each cell 74. (The same reference numerals are used in referring to the components of the alternative annular grid 68A of FIGS. 7-13 as used to identify the components of the preferred annular grid 68 of FIGS. 4-6).

The protrusions 78 on the inner straps 70 have a trapezoidal arched configuration open to normal longitudinal coolant flow through the annular grid 68 so as to minimize any effect on pressure drop through the grid, whereas the protrusions 80 on the outer straps 72 have a trapezoidal arched configuration parallel to normal longitudinal coolant flow through the annular grid 68 but across and in blocking relation to jetting flow from the baffle structure 20. Both of the protrusions 78,80 are generally rigid and formed on their associated straps 70,72 by a conventional stamping operation. Although protrusions 78 on the inner straps 70 project into the cells 74 a greater distance than protrusions 80 on the outer straps 72, both sets of protrusions 78,80 project into each of the cells 74 through a sufficient distance to contact and hold each fuel rod 48A received through each cell at four circumferentially spaced points on the respective opposing sides of the fuel rod. The relationship of the protrusions is such that two of them lie in a first horizontally extending plane, whereas the other two of the four protrusions lie in a second horizontally extending plane which is parallel to and axially spaced below the first horizontal plane. It can be seen from these views that each inner strap 70 has two protrusions 78 formed thereon at each cell 74, with one of the protrusions 78 projecting into one of the cells and the other projecting oppositely from the first and into the adjacent cell.

It is important to note also that the sleeves 82, which attach the annular grid 68 to the several guide thimbles 44 being less in number than the total thereof in the fuel assembly 16A, are not connected with, and are substantially shorter in length than the distance between, the ones of the regular support grids 46 disposed above and below adjacent to the annular grid 68. A comparison of FIGS. 10 and 11 reveals that the sleeve 82 does not project by any substantial amount below the outer strap 72 of the grid 68. In such manner, the annular anti-vibration grids 68 being axially spaced along and connected to the selected ones of the guide thimbles 44 between at least some of the regular support grids 46 are entirely separate from and unconnected to the regular support grids.

In instances where intermediate flow mixer grids, such as disclosed in the third application cross-referenced above, are already present between the regular support grids 46 in the top half of the fuel assemblies 16A, the annular grids 68 are only positioned between the support grids 46 being located nearer to the bottom nozzle 42 than to the top nozzle 44 or in the bottom half of the fuel assemblies, as is the case in FIG. 3.

It will be understood that the fuel assemblies 16A with the annular anti-vibration grids 68 are only placed in the peripheral core locations most susceptible to coolant fluid jetting action through the baffle structure 20. Since the number of fuel assemblies with these annular grids 68 will be small, its impact on overall core pressure drop will be small. Also, since these peripheral core locations typically have low relative power, these assemblies will not become DNB limiting. The presence of the annular grid 68 in the outer three continuous rows of fuel rods 48A will cause more coolant to flow through longitudinally through the void region 76 of the grid and the center of the fuel assembly causing the grid to have an impact on DNB performance of the fuel assembly. But again, since the fuel assembly will have smaller relative power, the assembly will not become DNB limiting.

Since the annular anti-vibration grids 68 are made of Zircaloy, and since only a few fuel assemblies will have these grids, the fuel cycle core penalty due to their presence will be small. Since it is preferable to limit the number of these fuel assemblies, they may be kept in the same peripheral core locations for several cycles. However, it is still advantageous to move these assemblies across the core diagonally in order to minimize burnup gradient and peaking factors. Unlike assemblies equipped with so-called anti-vibration clips, the assemblies with annular grids may be moved inboard to other low power locations if needed.

From mechanical and handling viewpoints, the use of the annular grid is desirable since it is not necessary to remove this grid unlike the so-called anti-vibration clips. This eliminates need for special handling tools and the critical path for refueling is not impacted.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a nuclear reactor fuel assembly including a top nozzle, a bottom nozzle, a plurality of guide thimbles extending longitudinally between and connected at their opposite ends to said top and bottom nozzles, a multiplicity of elongated fuel rods, a plurality of support grids axially spaced along and supported by said guide thimbles, each of said support grids defining a multiplicity of cells at least equal in number to said multiplicity of fuel rods for receiving respective ones of said fuel rods therethrough and supporting said fuel rods in a side-by-side array with respect to one another and to said guide thimbles, the improvement which comprises:
    (a) a plurality of annular anti-vibration grids axially spaced along, and connected to at least some of, said guide thimbles between at least some of said support grids;
    (b) said annular grids being separate from and unconnected to said support grids;
    (c) each of said annular grids defining a plurality of cells being less in number than said multiplicity of fuel rods but at least equal in number to a plurality of said fuel rods positioned about the periphery of said multiplicity of fuel rods, said annular grid cells for receiving therethrough respective ones of said fuel rods in said plurality thereof and engaging said fuel rods so as to dampen any coolant fluid cross flow vibration induced therein.

2. The fuel assembly as recited in claim 1, wherein each of said annular grids is composed of a plurality of interleaved members arranged in an egg-crate configuration to define said plurality of cells and a central void region of a size to receive therethrough the rest of said fuel rods in said multiplicity thereof.

3. The fuel assembly as recited in claim 1, wherein each of said annular grids includes a plurality of interleaved members defining said plurality of cells and means defined on said members and projecting within said cells for engaging said fuel rods in said plurality thereof.

4. The fuel assembly as recited in claim 3, wherein said fuel rod engaging means includes a plurality of protrusions formed on said members and projecting into each of said cells in said plurality thereof through a sufficient distance to contact opposing sides of said fuel rod received through said each cell.

5. The fuel assembly as recited in claim 1, wherein each of said annular grids includes a plurality of interleaved members defining said plurality of cells and coolant flow deflecting means defined on said members and projecting upwardly and inwardly toward a longitudinal axis of said each cell.

6. The fuel assembly as recited in claim 1, wherein said each of said annular grids includes a number of sleeves adapted to receive a like number of said guide thimbles therethrough, said number of said guide thimbles being less than said plurality thereof, said sleeves being attached to said guide thimbles and unconnected with, and shorter in length than the distance between, the ones of said support grids disposed adjacent to said each annular grid.

7. The fuel assembly as recited in claim 1, wherein said plurality of annular grids are positioned between said support grids located nearer to said bottom nozzle than to said top nozzle.

8. In a nuclear reactor fuel assembly including a top nozzle, a bottom nozzle, a plurality of guide thimbles extending longitudinally between and connected at their opposite ends to said top and bottom nozzles, a multiplicity of elongated fuel rods, a plurality of support grids axially spaced along and supported by said guide thimbles, each of said support grids defining a multiplicity of cells at least equal in number to said multiplicity of fuel rods for receiving respective ones of said fuel rods therethrough and supporting said fuel rods in a side-by-side array with respect to one another and to said guide thimbles, the improvement which comprises:
    (a) a plurality of annular anti-vibration grids axially spaced along, and connected to at least some of, said guide thimbles between at least some of said support grids;
    (b) said annular grids being separate from and unconnected to said support grids;
    (c) each of said annular grids defining a plurality of cells being less in number than said multiplicity of fuel rods but at least equal in number to a plurality of said fuel rods positioned about the periphery of said multiplicity of fuel rods, said annular grid cells for receiving therethrough respective ones of said fuel rods in said plurality thereof and engaging said fuel rods so as to dampen any coolant fluid cross flow vibration induced therein;
    (d) each of said annular grids being composed of a plurality of interleaved members arranged in an egg-crate configuration to define said plurality of cells and a central void region of a size to receive therethrough the rest of said fuel rods in said multiplicity thereof;
    (e) each of said annular grids including
        (i) a plurality of protrusions formed on said members and projecting into each of said cells in said plurality thereof through a sufficient distance to contact opposing sides of said fuel rod received through said each cell, and
        (ii) a number of sleeves adapted to receive a like number of said guide thimbles therethrough, said number of said guide thimbles being less than said plurality thereof, said sleeves being attached to said guide thimbles and unconnected with, and shorter in length than the distance between, the ones of said support grids disposed adjacent to said each annular grid.

9. In a nuclear reactor, the combination comprising:

(a) a reactor core composed of a plurality of fuel assemblies disposed in side-by-side spaced relationships, a first group of said fuel assemblies defining the periphery of said core and a second group of said fuel assemblies positioned inwardly of and encompassed by said first group thereof;

(b) each of said fuel assemblies having a plurality of elongated guide thimbles, a multiplicity of elongated fuel rods, a plurality of support grids axially spaced along and supported by said guide thimbles, each of said support grids defining a multiplicity of cells at least equal in number to said multiplicity of fuel rods for receiving respective ones of said fuel rods therethrough and supporting said fuel rods in a side-by-side array with respect to one another and to said guide thimbles;

(c) a baffle structure extending about said reactor core adjacent said fuel assemblies in said first group thereof, said baffle structure having components being subject to unpredictable loosening with respect to one another so as to permit jetting of coolant fluid from the exterior to the interior of said baffle structure and impingement upon fuel rods in said fuel assemblies of said first group thereof so as to cause vibration of said fuel rods; and (d) a plurality of annular anti-vibration grids axially spaced along, and connected to at least some of, said guide thimbles of said fuel assemblies in said first group thereof between at least some of said support grids of said fuel assemblies in said first group thereof, said annular grids being separate from and unconnected to said support grids, each of said annular grids defining a plurality of cells being less in number than said multiplicity of fuel rods of each of said fuel assemblies in said first group thereof but at least equal in number to the plurality of said fuel rods positioned about the periphery of said each fuel assembly in said first group thereof for receiving respective ones of said fuel rods therethrough and engaging said fuel rods so as to dampen vibration thereof due to impingement by coolant fluid jetting from said baffle structure.

10. The nuclear reactor as recited in claim 9, wherein each of said annular grids is composed of a plurality of interleaved members arranged in an egg-crate configuration to define said plurality of cells and a central void region of a size to receive therethrough the rest of said fuel rods in said multiplicity thereof.

11. The nuclear reactor as recited in claim 9, wherein each of said annular grids includes a plurality of interleaved members defining said plurality of cells and means defined on said members and projecting within said cells for engaging said fuel rods in said plurality thereof.

12. The nuclear reactor as recited in claim 11, wherein said fuel rod engaging means includes a plurality of protrusions formed on said members and projecting into each of said cells in said plurality thereof through a sufficient distance to contact opposing sides of said fuel rod received through said each cell.

13. The nuclear reactor as recited in claim 9, wherein each of said annular grids includes a plurality of interleaved members defining said plurality of cells and coolant flow deflecting means defined on said members and projecting upwardly and inwardly toward a longitudinal axis of said each cell.

14. The nuclear reactor as recited in claim 9, wherein said each of said annular grids includes a number of sleeves adapted to receive a like number of said guide thimbles therethrough, said number of said guide thimbles being less than said plurality thereof, said sleeves being attached to said guide thimbles and unconnected with, and shorter in length than the distance between, the ones of said support grids disposed adjacent to said each annular grid.

15. The nuclear reactor as recited in claim 9, wherein said plurality of annular grids are positioned between said support grids located nearer to the bottom than to the top of said fuel assemblies.

16. In a nuclear reactor, the combination comprising:

(a) a reactor core composed of a plurality of fuel assemblies disposed in side-by-side spaced relationships, an outer group of said fuel assemblies defining the periphery of said core and an inner group of said fuel assemblies positioned inwardly of and encompassed by said outer group thereof;

(b) each of said fuel assemblies having a plurality of elongated guide thimbles, a multiplicity of elongated fuel rods, a plurality of support grids axially spaced along and supported by said guide thimbles, each of said support grids defining a multiplicity of cells at least equal in number to said multiplicity of fuel rods for receiving respective ones of said fuel rods therethrough and supporting said fuel rods in a side-by-side array with respect to one another and to said guide thimbles;

(c) a baffle structure extending about said reactor core adjacent said fuel assemblies in said outer group thereof, said baffle structure having components being subject to unpredictable loosening with respect to one another so as to permit jetting of a coolant fluid from the exterior to the interior of said baffle structure and impingement upon fuel rods in said fuel assemblies of said outer group thereof so as to cause vibration of said fuel rods; and (d) a plurality of annular anti-vibration grids axially spaced along, and connected to at least some of, said guide thimbles of said fuel assemblies in said outer group thereof between at least some of said support grids of said fuel assemblies in said outer group thereof, said annular grids being separate from and unconnected to said support grids, each of said annular grids defining a plurality of cells being less in number than said multiplicity of fuel rods of each of said fuel assemblies in said outer group thereof but at least equal in number to the plurality of said fuel rods positioned about the periphery of said each fuel assembly in said outer group thereof for receiving respective ones of said fuel rods therethrough and engaging said fuel rods so as to dampen vibration thereof due to impingement by coolant fluid jetting from said baffle structure;

(e) each of said annular grids being composed of a plurality of interleaved members arranged in an egg-crate configuration to define said plurality of cells and a central void region of a size to receive therethrough the rest of said fuel rods in said multiplicity thereof, each of said annular grids including (i) a plurality of protrusions formed on said members and projecting into each of said cells in said plurality thereof through a sufficient distance to contact opposing sides of said fuel rod received through said each cell, and (ii) a number of sleeves adapted to receive a like number of said guide thimbles therethrough, said number of said guide thimbles being less than said plurality thereof, said sleeves being attached to said guide thimbles and unconnected with, and shorter in length than the distance between, the ones of said support grids disposed adjacent to said each annular grid.

* * * * *